Figure 1:
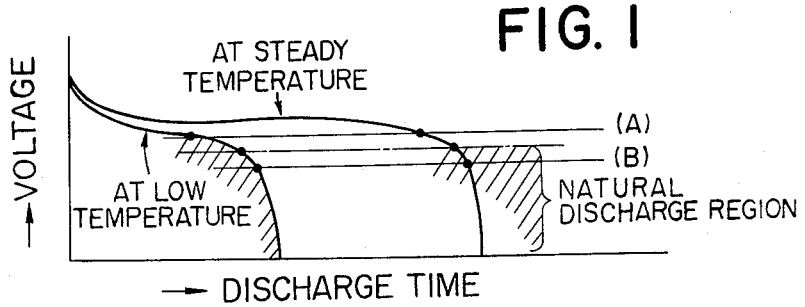

United States Patent
Tomomitsu et al.

[15] 3,671,769
[45] June 20, 1972

[54] EXPOSURE MEASURING DEVICE

[72] Inventors: Toshio Tomomitsu; Tatsuo Fujii, both of Tokyo, Japan

[73] Assignee: Nippon Kogaku K.K., Tokyo, Japan

[22] Filed: Jan. 6, 1970

[21] Appl. No.: 865

[30] Foreign Application Priority Data

Jan. 10, 1969 Japan.....................................44/1684

[52] U.S. Cl...............................307/311, 250/206, 95/10, 307/309
[51] Int. Cl.........................................................G01j 1/00
[58] Field of Search......................307/311; 250/206; 95/10

[56] References Cited

UNITED STATES PATENTS

| | | | |
|---|---|---|---|
| 3,476,944 | 11/1969 | Odone | 250/206 |
| 3,516,750 | 6/1970 | Schmitt | 95/10 C |
| 3,502,011 | 3/1970 | Rentschler | 250/206 |
| 3,487,757 | 1/1970 | Kiper | 95/10 C |
| 3,418,479 | 12/1968 | Schmitt | 307/311 |
| 3,295,424 | 1/1967 | Biber | 307/311 |

*Primary Examiner*—Donald D. Forrer
*Assistant Examiner*—Harold A. Dixon
*Attorney*—Ward, McElhannon, Brooks & Fitzpatrick

[57] ABSTRACT

Exposure measuring device having means for compensating the variation of power source voltage. A feedback means is incorporated in the exposure measuring device so that upon switching the switches to the contacts for the compensation of the variation of the voltage of the power source, the compensation of the voltage is automatically affected and the proper exposure measuring is performed.

8 Claims, 6 Drawing Figures

EXPOSURE MEASURING DEVICE

The present invention relates to an exposure measuring device employing a battery power source such as silver or mercury battery.

In the conventional exposure measuring device, the voltage of the power source is varied over a wide range due to the aging and temperature variations so that the error in exposure measuring is directly resulted from the voltage variation.

Accordingly, the primary object of the present invention is to provide an exposure measuring device having means which can electrically compensate any voltage variation of the power source, thereby eliminating the defect as described above of the conventional exposure measuring device.

According to the present invention, in an exposure measuring circuit including a checker circuit of the type in which when the voltage or current between two specific points in said circuit becomes a predetermined voltage (V) or current (I), the optimum exposure is indicated, is provided a power source voltage variation compensating circuit comprising a pair of switching elements one of which is conductive and the other of which is non-conductive depending upon the potential or current difference caused by the voltage variation of a power source (E) between the point (A) at which said voltage (V) or current (I) can be detected in said exposure measuring circuit and the point (B) in the power source voltage variation compensating circuit; a pair of optimum exposure indicating lamps, one of said lamps being turned on when one of said switching elements is conductive whereas the other of said lamps being turned on when the other of said switching elements is conductive and both of said lamps being turned on when there is no potential or current difference between said two points (A) and (B); voltage compensating means adapted to eliminate said potential or current difference between said two points (A) and (B); and a power source (Eo), whereby said compensating means is adjusted upon the voltage check by said checker circuit so that the voltage (Vo) or current (Io) appeared at said point (B) of said power source voltage compensating circuit is made equal to a predetermined voltage or current appeared at said point (A) after the voltage variation of said power source (E) and when the exposure is measured or controlled, the voltage or current appeared at said point (A) is made equal to the voltage (Vo) or current (Io) appeared at said point (B) by adjusting a variable resistor coupled to an exposure factor such as a shutter speed, an aperture, a sensitivity of film used, etc.

According to the present invention, the voltage variation of the power source due to the aging and temperature variations may be electrically compensated and the exposure is controlled based upon the compensated voltage of the power source so that the exposure may always be accurately controlled without any error.

The above and other objects, features and advantages of the present invention will become more apparent from the following description of illustrative embodiments thereof with reference to the accompanying drawing, in which:

FIG. 1 is a graph showing the discharge curve of a conventional silver or mercury battery; and FIGS. 2, 3, 4, 5 and 6 are circuit diagrams of five different embodiments of the present invention, respectively.

Referring to FIG. 1 illustrating the discharge curve of a mercury or silver battery, (A) designates a so-called "check point," that is the lowest operating voltage of a power source for the conventional exposure meter immediately above the "natural discharge region"; and (B) designates the "check point" indicating the lowest operating voltage of a power source for an exposure meter in accordance with the present invention in the "natural discharge region."

A first embodiment of the present invention will be described hereinafter with reference to FIG. 2. In the first embodiment, npn and pnp type transistors $Tr_1$ and $Tr_2$ are employed as switching elements in a power source voltage variation compensation circuit. Reference character E designates a power source; $Rc$, a resistance of a CdS photocell connected to the transistors in series; $Rv$, a variable resistor connected to the transistors in parallel and operatively coupled to the exposure factors (such as shutter speed, aperture, sensitivity of film used, etc.); $Rm$, a fixed resistor; and SW1 and SW2, selection switches coupled to each other for simultaneously connecting the CdS or the variable resistor to the transistors. The above described components constitute an exposure measuring circuit.

The exposure measuring circuit described above is so arranged that when the voltage across the variable resistor $Rv$ is a predetermined voltage $V_I$, that is when a predetermined current I flows through the fixed resistor $Rm$, the exposure measuring circuit gives an optimum exposure. Resistors $Rc'$ and $Rv'$ respectively connected to the CdS cell and the variable resistor in parallel have the resistances equal to those of the CdS cell resistance $Rc$ and the variable resistor $Rc$, respectively, when the optimum exposure is obtained. The fixed resistors $Rc'$ and $Rv'$ constitute a checker circuit together with the power source E, the fixed resistor $Rm$ and switches SW1 and SW2. The checker circuit is so designed that when the switches SW1 and SW2 are switched to CH contacts, the predetermined voltage $V_1$ at the optimum exposure is obtained at the point (A) in FIG. 1.

Figure 2:
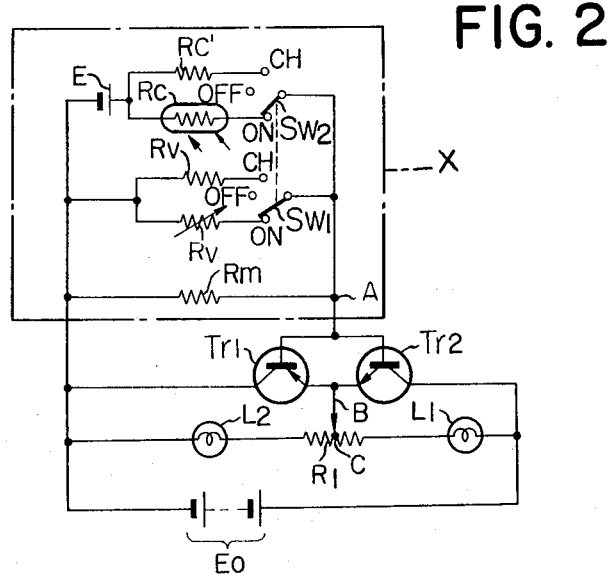

The above described exposure measuring circuit and checker circuit constitute an exposure measuring circuit designated generally by X in FIG. 2, including the checker circuit. Reference characters $Tr_1$ and $Tr_2$ are npn and pnp type transistors respectively. A variable compensating resistor $R_1$ is such that when its slide brush B which is connected to both of the emitter electrodes of the transistors $Tr_1$ and $Tr_2$ is moved, the potential at the point $c$ is adjusted, thereby compensating the voltage variation of the power source E. Both of the optimum exposure indicating lamps L1 and L2 are turned on in order to indicate that the voltage variation of the power source E has been compensated or that the optimum exposure is obtained. The above components $Tr_1$, $Tr_2$, $R_1$, L1, L2 and a power source $E_o$ constitute a power source voltage variation compensating circuit. When upon the variation in voltage of the power source E due to the aging or temperature variation, the switches SW1 and SW2 are manually switched to the terminals CH, the voltage at the point (A) in FIG. 1 becomes a new voltage $V_1'$ at the optimum exposure which is varied in response to the variation of the voltage of the power source E. The checker circuit and the voltage variation compensating circuit are so designed that when upon displacement of the brush B of the variable resistor $R_1$ the potential at the point $c$ becomes equal to that at the point (A), the lamps L1 and L2 are turned on. When the voltage at the point $c$ is higher than that at the point (A) while the brush B is being displaced, the transistor $Tr_1$ is conductive while the transistor $Tr_2$ is non-conductive so that only the lamp L1 is turned on. On the other hand, when the voltage at the point C is lower than that at the point (A), the transistor $Tr_1$ is cut-off whereas the transistor $Tr_2$ is conductive so that only the lamp L2 is turned on. The voltage variation compensating circuit and the exposure measuring circuit are so designed that both of the lamps L1 and L2 are turned on simultaneously when the switches SW1 and SW2 are switched to the terminals ON after the voltage variation of the power source E has been compensated and when the voltage at the point (A) in FIG. 1 becomes a new voltage $V_1'$ for the optimum exposure in response to the voltage variation of the power source E, that is when the voltage at the point (A) is made equal to that at the point $c$.

Next the mode of operation of the first embodiment will be described. To compensate the voltage variation of the power source E due to the aging or temperature variation, the switches SW1 and SW2 are switched to the terminals CH and the brush B of the variable resistor $R_1$ is moved to a position where both of the optimum exposure indicating lamps L1 and L2 are turned on simultaneously. In this case, the voltage at the point $c$ is so corrected that both of the indicating lamps L1 and L2 are turned on only when the voltage at the point $c$ becomes equal to the new voltage $V_1'$ at the point (A) which has been set in response to the voltage E′ of the power source E caused by the voltage variation thereof. This means that the voltage variation in the power source E has been compensated. In this state, the switches SW1 and SW2 are switched to the terminals ON and the resistance of the variable resistor $Rv$ is so adjusted as to turn on both of the indicating lamps L1 and L2 simultaneously. This means that the voltage at the point (A) is set to the new voltage $V_1'$ for the optimum exposure and that the optimum exposure is achieved. It is noted that instead of the transistors $Tr1$ and $Tr2$, the field effect transistors may be employed if desired.

Figure 3:
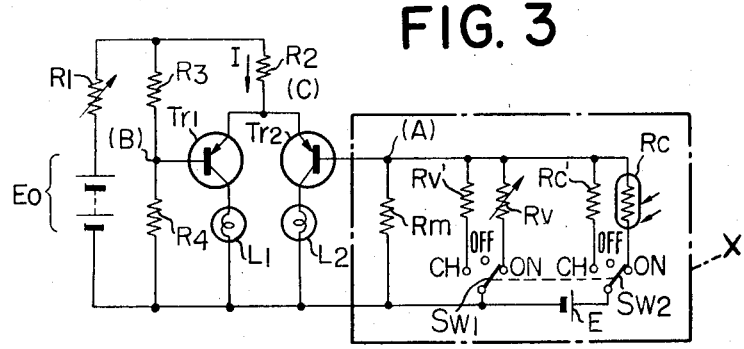

Next a second embodiment of the present invention will be described hereinafter with reference to FIG. 3. In the second embodiment, two pnp type transistors are employed as switching elements. In FIG. 3, reference character X generally designates an exposure measuring circuit as in the case of the first embodiment shown in FIG. 2. The optimum exposure indicating lamps L1 and L2 are connected to the collector electrodes of the transistors $Tr1$ and $Tr2$ respectively. A variable compensating resistor $R_1$ varies its resistance so as to adjust the voltages at the points (B) connected to the base of the transistor $Tr1$ and (C) connected to the emitter of the respective transistors, thereby compensating the voltage variation of the power source E. Reference characters R2, R3 and R4 designate fixed resistors, and $E_o$ a power source. The above described components constitute the power source voltage variation compensating circuit, which is so designed that when the transistor $Tr2$ is non-conductive, the potential at the point (C) is slightly higher than that at the point (B). When the switches SW1 and SW2 are switched to the terminals CH when the voltage of the power source E varies, the voltage at the point (A) connected to the base of the transistor $Tr2$ becomes a new voltage $V_1'$ for the optimum exposure which is set in response to the voltage variation of the power source E. The checker circuit and the compensating circuit are so designed that when upon adjustment of the variable resistor $R_1$ the potential at the point (B) is made equal to that at the point (A), the both of indicating lamps L1 and L2 are turned on simultaneously. The checker circuit and the compensating circuit are further so designed that when the potential at the point (A) is higher than that at the point (B) in the course of adjustment of the resistance of the variable resistor $R_1$, that is when the potential at the point (A) is higher than that at the point (C), the transistor $Tr1$ is conductive while the transistor $Tr2$ is cut off so that only the indicating lamp L1 is turned on. On the other hand, when the potential at the point (B) is higher than that at the point (A), the transistor $Tr2$ is conductive so that the potential at the point (C) is slightly lowered, whereby the transistor $Tr1$ is driven into the non-conductive state, thereby turning on only the indicating lamp L2.

The exposure measuring circuit and the compensating circuit are so arranged that both of the indicating lamps L1 and L2 are turned on simultaneously when the switches SW1 and SW2 are switched to the terminals ON after the voltage variation of the power source E has been compensated and when the potential at the point (A) is set to the new voltage $V_1'$ for the optimum exposure in response to the voltage variation of the power source E, that is when the potential at the point (A) is made equal to that at the point (B).

Next the mode of operation of the second embodiment will be described. To compensate the voltage variation of the power source E, the switches SW1 and SW2 are switched to the terminals CH and the variable resistor $R_1$ is so adjusted that both of the indicating lamps L1 and L2 are simultaneously turned on. In this case, the potential at the point (B) is so adjusted that both of the indicating lamps L1 and L2 are simultaneously turned on only when the potential at the point (B) becomes equal to the new voltage $V_1'$ at the point (A) which has been set in response to the variation in voltage of the power source E. This means that the voltage variation of the power source E has been compensated. In this state, the switches SW1 and SW2 are switched to the terminals ON. If the lamps L1 and L2 are simultaneously turned on, this means that the potential at the point (A) is set to the new voltage $V_1'$ for the optimum exposure. That is, the optimum exposure is achieved.

Figure 4:
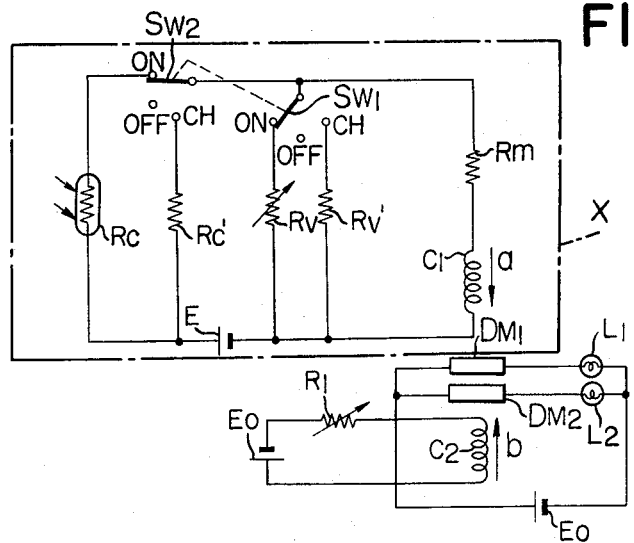

Next a third embodiment of the present invention employing magnet diodes as switching element will be described with reference to FIG. 4. Reference character X designates the exposure or brightness measuring circuit similar to that in the first embodiment described with reference to FIG. 2, except that an electromagnetic coil C1 having the direction of magnetic field indicated by the arrow $a$ is connected in series to the fixed resistor $Rm$. Reference character $R_1$ also designates a variable resistor for compensation and C2, another electromagnetic coil disposed in opposed relation with the electromagnetic coil C1 and having the direction of magnetic field indicated by the arrow $b$. Magnet diodes DM1 and DM2 are respectively connected to the lamps L1 and L2 and are arranged in back to back relation so that one of the magnet diodes is actuated by the magnetic field set up by one of the electromagnetic coils C1 and C2 whereas the other magnet diodes, by the other electromagnetic coil. The above described components together with the optimum exposure indicating lamps L1 and L2 and the power source $E_o$ constitute the voltage variation compensating circuit. When the switches SW1 and SW2 are switched to the terminals CH, the magnetic field in the direction indicated by the arrow $a$ has a field intensity $H'$ which is generated by a predetermined current flow $I'$ for the optimum exposure which in turn is varied in response to the voltage variation of the power source E. The checker circuit and the power source voltage variation compensating circuit are so arranged that when upon adjustment of the variable compensating resistor $R_1$ which is connected to the magnetic coil C2 the field intensity in the direction indicated by the arrow $b$ is made equal to that of the magnetic filed in the direction indicated by the arrow $a$, both of the indicating lamps L1 and L2 are simultaneously turned on. The above two circuits are further so arranged that when upon the adjustment of the variable resistor $R_1$ the field intensity in the direction of the arrow $b$ becomes stronger than that in the direction of the arrow $a$, the relative magnetic field acts only in the direction of the arrow $b$ so that the current flows only through the magnet diode DM1, thereby turning the indicating lamp L1 only. On the other hand, when the field intensity in the direction of the arrow $b$ is weaker than that in the direction of the arrow $a$, the relative magnetic field acts only in the direction of the arrow $a$ between the magnetic diodes DM1 and DM2 so that the current flows only through the magnet diode DM2, thereby turning on the indicating lamp L2 only.

The exposure measuring circuit and the voltage variation compensating circuit are so arranged that when the switches SW1 and SW2 are switched to the terminals ON after the voltage variation of the power source E has been compensated and when upon the adjustment of the variable resistor $Rv$ the field intensity in the direction of the arrow $a$ is made equal to that $H'$ in the direction of the arrow $b$, both of the indicating lamps L1 and L2 are simultaneously turned on.

Next the mode of the third embodiment will be described hereinafter. To compensate the voltage variation of the power source E, the switches SW1 and SW2 are switched to the terminals CH and the variable compensating resistor $R_1$ is so adjusted that the indicating lamps L1 and L2 are simultaneously turned on. In this case, the field intensity in the direction indicated by the arrow $b$ is so adjusted that both of the lamps L1 and L2 are simultaneously turned on only when the field intensity in the direction of the arrow $b$ becomes equal to the predetermined field intensity $H'$ generated by the predetermined current $I'$ for the optimum exposure which in turn is determined in response to the voltage $E'$ of the power source E caused by the voltage variation thereof. This means that the voltage variation of the power source has been compensated. In this state the switches SW1 and SW2 are switched to the terminal ON and the variable resistor $Rv$ is so adjusted that both of the indicating lamps L1 and L2 are simultaneously turned on. This means that the field intensity in the direction of the arrow $a$ is made equal to the field intensity H' generated by the predetermined current I' for the optimum exposure. That is, the optimum exposure is achieved.

Figure 5:
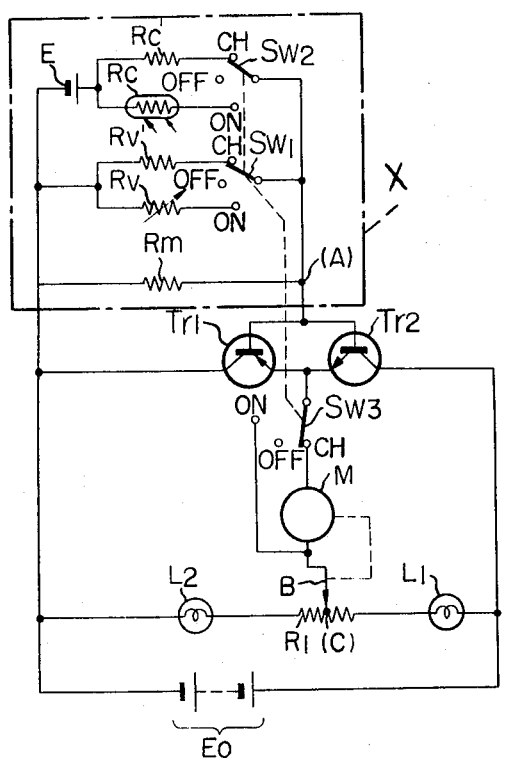

Next a fourth embodiment of the present invention of the type in which the adjustment of the compensating resistor $R_1$ is automatically made will be described with reference to FIG. 5. Both of pnp and npn type transistors Tr1 and Tr2 are employed in the power source voltage variation compensating circuit as switching elements and have their emitter electrodes connected to a servo motor M which moves the sliding arm B of the variable resistor $R_1$.

The two-phase servo motor M is interconnected between the transistors Tr1 and Tr2 similar to those described in the first embodiment with reference to FIG. 2 and the sliding brush B of the variable resistor $R_1$ and adapted to reverse its rotation in response to the direction of the current flowing therethrough thereby displacing the brush B in either direction. A switch SW3 is operatively coupled to the switches SW1 and SW2.

When all of the switches SW1 to SW3 are switched to the terminals CH and when the potential at the point (c) of the resistor R1 is lower than that at the point (A), the transistors Tr2 is conductive so that the current flows from the point (A) to the point (C), thereby rotating the two-phase servomotor M in the forward direction. Therefore, the sliding brush B is caused to move to the right. On the other hand, when the potential at the point (C) is higher than that at the point (A), the transistor Tr1 is conductive so that the current flows from the point (C) to the point (A), whereby the two-phase servomotor M rotates in the reversed direction so as to cause the sliding brush B to move to the left. When the potential at the point (C) becomes equal to that at the point (A) by the adjustment of the variable compensating resistor $R_1$ by the rotation of the motor M, no current is supplied to the motor M and the indicating lamps L1 and L2 are both turned on, thus indicating the automatic compensation of the voltage variation of the power source E. It is noted that when all of the switches from SW1 to SW3 are switched to the contacts ON for exposure or brightness measuring, the servomotor is disconnected from the circuit.

Figure 6:
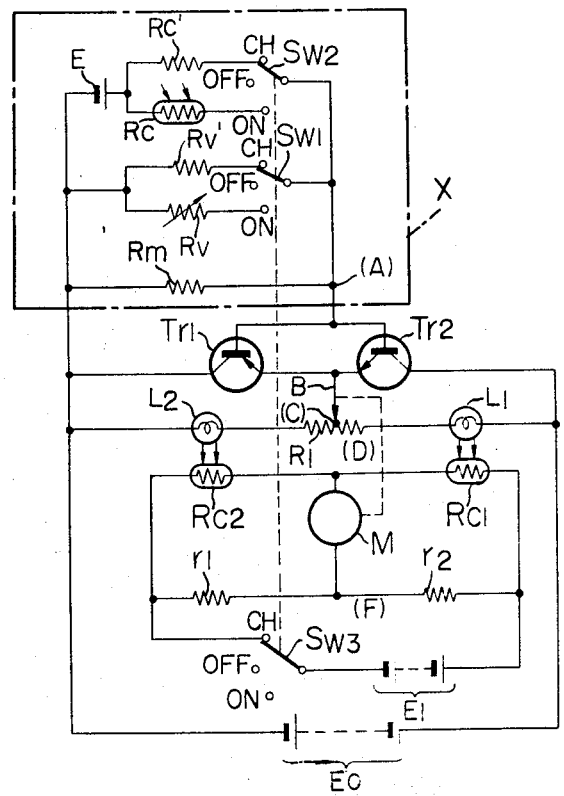

Next a fifth embodiment of the present invention will be described with reference to FIG. 6. The fifth embodiment employs the feedback mechanism including CdS photocells arranged in opposed relation with the indicating lamps of the first embodiment, thereby moving the sliding brush of the variable resistor. That is, the feedback mechanism is comprised of the CdS photocells Rc1 and Rc2, fixed resistors r1 and r2, a two-phase servomotor M adapted to reverse its rotation depending upon the direction of the current flow and to move the sliding brush B of the variable resistor, a switch SW3 operatively coupled to the switches SW1 and SW2 and a power source E'. The feedback mechanism described above is incorporated in the first embodiment.

When the switches SW1 and SW2 are switched to the contacts CH, and when the potential at the point (C) is lower than that at the point (A), the indicating lamp L2 is turned on and the current flows only through the CdS photocell RC2, so that the potential difference is caused between the points (F) and (D). That is, the current flows from the point (F) to the point (D) so that the two-phase servomotor M is caused to rotate so as to move the sliding brush B to the right. On the other hand, when the potential at the point (C) is higher than the point (A), the indicating lamp L1 is only turned on and the current flows only through the CdS photocell Rc1 so that the potential difference is caused between the points (D) and (F). Thus the current flows from the point (D) to the point (F) so that the two-phase servomotor M is reversed in direction, thereby causing the sliding brush B to move to the left. When the potential at the point (C) is made equal to that at the point (A) by the adjustment of the variable compensating resistor $R_1$ by the servomotor M, both of the indicating lamps L1 and L2 are turned on and the current flows through both of the CdS cells Rc1 and Rc2 so that there is no potential difference between the points (D) and (F). Thus no current is supplied to the motor M. In this case, the voltage variation of the power source E is automatically compensated.

In order to see if the power source E is still operative or not (that is if the voltage of the power source is above or below the point (B) in FIG. 1), the adjustment range of the variable compensating resistor $R_1$ is so limited that the resistor $R_1$ cannot compensate the voltage variation of the power source when the voltage thereof drops below the point (B) in FIG. 1.

It is noted that in all of the embodiments described above, the voltage variation of the power source $E_o$ is simultaneously compensated.

What is claimed is:

1. An exposure measuring device for use with a photographic camera comprising
   a first power source for light measurement;
   a light measuring circuit including a photo-resistor responsive to the light from the object to be photographed, and a variable resistor connected to said photo-resistor in series and operable in cooperation with an exposure factor setting of the camera;
   a voltage checker circuit for said first power source including a first fixed resistor connected to said variable resistor in parallel, and a second fixed resistor connected to said photo-resistor in parallel;
   switching means for selectively connecting said first power source either to said light measuring circuit or to said voltage checker circuit;
   a third resistor connected to said light measuring and voltage checker circuits in parallel for obtaining the output voltage of said circuits,
   an electrically actuated indicating device including a pair of signal lamps, a second power source for lighting said lamps, a voltage divider for said second power source, and electronic switching means for detecting a potential difference between said third resistor and said voltage divider, said electronic switching means including a pair of transistors having opposite conductive characteristics and connected to said respective lamps;
   and voltage compensating means adapted to eliminate said potential difference when said switching means connects said voltage checker circuit to said first power source, and provided in the circuit of said indicating device.

2. An exposure measuring device according to claim 1, wherein one of said transistors is a pnp type and the other is an npn type and said voltage compensating means includes a variable resistor having a movable contact, each base of said transistors being connected to said third resistor and each emitter of said transistors being connected to said movable contact.

3. An exposure measuring device according to claim 2, wherein said voltage compensating means further includes a motor for moving said movable contact and a switch for controlling said motor in cooperation with said switching means.

4. An exposure measuring device according to claim 3, wherein said switch selectively connects the emitter of said transistors to said movable contact either directly or through said motor.

5. An exposure measuring device according to claim 3, wherein said voltage compensating means further includes a pair of photo responsive elements illuminated by said respective lamps, and connected to said motor, thereby controlling the rotating direction of said motor by said pair of photoresponsive elements.

6. An exposure measuring device according to claim 1, wherein the base of one of said transistors is connected to said third resistor, and the base of other of said transistors is connected to said voltage divider and the collectors of said transistors are connected to said respective lamps.

7. An exposure measuring device according to claim 6, wherein said voltage compensating means includes a variable resistor provided between said second power source and both of the emitters of said transistors.

8. An exposure measuring device for use with a photographic camera comprising a first power source for light measurement;

a light measuring circuit including a photo-resistor responsive to the light from the object to be photographed, and a variable resistor connected to said photo-resistor in series and operable in accordance with an exposure factor setting of the camera;

a voltage checker circuit for said first power source including a first fixed resistor connected to said variable resistor in parallel, and a second fixed resistor connected to said photo-resistor in parallel;

a first electrical magnetic coil operable by said power source;

switching means for selectively connecting said first electrical magnetic coil either to said exposure measuring circuit or to said voltage checker circuit;

a second electrical magnetic coil opposite to said first electrical magnetic coil;

a second power source for said second coil;

a pair of magnetic diodes provided in the magnetic field of said first and second magnetic coils;

and responsive to the magnetic flux of said respective magnetic coil; each of said magnetic diodes being conductive in accordance with the difference between the intensities of said magnetic fluxes;

a pair of signal lamps connected to said respective magnetic diodes in series;

and a variable resistor for controlling the current flowing through said second magnetic coil when said switching means is connected to said voltage checker circuit.

* * * * *